United States Patent [19]

Doyama

[11] Patent Number: 4,794,472
[45] Date of Patent: Dec. 27, 1988

[54] VIDEO TAPE REPRODUCING APPARATUS WITH A PROCESSOR THAT TIME-SHARES DIFFERENT OPERATIONS

[75] Inventor: Yoshiaki Doyama, Hirakata, Japan

[73] Assignee: Matsushita Electric Industrial Co., Ltd., Kadoma, Japan

[21] Appl. No.: 889,858

[22] Filed: Jul. 28, 1986

[30] Foreign Application Priority Data

Jul. 30, 1985 [JP] Japan .................................. 60-167936
Aug. 2, 1985 [JP] Japan .................................. 60-171553
Aug. 20, 1985 [JP] Japan .................................. 60-182112

[51] Int. Cl.⁴ .......................... G11B 5/52; G11B 5/584
[52] U.S. Cl. ...................................... 360/70; 360/10.2; 360/73.08; 360/77.07
[58] Field of Search ............ 360/77, 70, 73, 10.1–10.3, 360/75, 69

[56] References Cited

U.S. PATENT DOCUMENTS 4,520,410 5/1985 Sekiguchi et al. ..................... 360/77
4,536,806 8/1985 Louth ..................................... 360/77

Primary Examiner—Alan Faber
Assistant Examiner—Steven R. Garland
Attorney, Agent, or Firm—Cushman, Darby & Cushman

[57] ABSTRACT

A reproducing apparatus wherein control of rotation of a rotary head, control of tape transportation and a control of the tracking of the head adjusting actuator are processed in a time-share fashion by a data processing device. The control is carried out by using a timer circuit, which has a period of one or several integer times the period of rotation of the rotary head. Computing processes for the above controls are selectively carried out on a time-shared basis. By using a DC component of the tracking error signal, a track transporting system capable of noiseless playback, and which has a wide range of tracking control.

21 Claims, 17 Drawing Sheets $$G(s) = -\frac{1 + CR_2 S}{CR_1 S}$$

$$H(Z) = \frac{a - bZ^{-1}}{1 - Z^{-1}}$$

Timer constant table

| Speed selection | Timer constant |
|---|---|
| ⋮ | |
| X 10 | 2014 μs |
| X 1 | 2085 μs |
| X 0 | 2093 μs |
| X (-1) | 2101 μs |
| X (-10) | 2173 μs |
| ⋮ | |

106

VIDEO TAPE REPRODUCING APPARATUS WITH A PROCESSOR THAT TIME-SHARES DIFFERENT OPERATIONS

FIELD OF THE INVENTION AND RELATED ART STATEMENT

1. Field of the Invention

The present invention relates generally to a magnetic video recording apparatus, and more particularly to such an apparatus having a tracking adjustment device to allow the recorded track to be accurately followed even when the recorded track is formed with curves therein.

2. Description of the Related Prior Art

A rotary head type video tape recorder (hereinafter referred to as a VTR) typically has special effects playback modes, such as fast playback or slow playback. In order to eliminate a noise bar on the reproduced pictures obtained, a configuration where playback heads are mounted on piezoelectric devices to enable adjustment and controlling of the position of the playback heads has been proposed. This technique allows accurate following of the recorded track by feeding an appropriate driving signal to the piezoelectric devices.

Adjustment of head positions of the VTR is necessary due to another reason. As the width of the recording track becomes narrower, in order to increase the recording density of the recording medium, the recording track on the tape does not necessarily an accurate linear shape. For example, there may be a bending of the maintained recording tracks due to expansion or shrinkage of the recording tape, or there may be a mistracking when a tape is played back using a different video tape recorder that the one the tape is recorded on, causing a mechanical characteristic difference between the two tape recorders and a consequent different of tracking.

FIG. 19 shows a tape pattern of a magnetic recording tape wherein the tracks are somewhat bent.

When a recorded magnetic tape having such bent tracks thereon is played back by a VTR, it is necessary to detect the deviations of the tracks from the theoretical accurate positions using signals obtained from playback heads. The positions of the heads are adjusted to better follow to the actual tracks on the recorded tape by feeding adjusting signals to electromechanical adjusting devices, such as instance piezoelectric devices.

In the VTR format called 8 mm video, instead of using the conventional control signals, pilot signals for tracking are recorded on the tape by rotary head(s) by superposing the pilot signal(s) on the video signal. During playback, the tracking of the heads are controlled using the pilot signal(s) recorded on the tape. In such a system, since the tracking error signal corresponds to the bending of the tracks, the head scanning can be made to follow the bending tracks by adjusting positions of the playback head(s) using piezoelectric devices or the like electromechanical device(s) fed by the error signal obtained from the playback heads. Therefore, using 8 mm video, accurate tracking by the heads on narrow tracks is assured, even when the playback is made by a different VTR setting from the one used to record the tape.

In the conventional VTR system, the tape transport control (capstan driving servo system), rotary head drum control and track deviation following control are all carried out with specifically designed and individually provided control circuits. Even when the above-mentioned three circuits are constituted by utilizing modern integrated circuit technology on one monolithic wafer as an IC, they are still formed with individual parts for each of the above-mentioned three circuits, without any particular mutual relation therebetween. Accordingly, the following problem exists in such a VTR. In the actual VTR, the rotary head drum drive control, tape transport control and track tracing control cannot operate independent of one another. Rather, they should be mutually related for good operation. For instance, when the tape transporting speed is changed, the relative speed between the head and the tape changes, and accordingly, it becomes necessary to change the rotation speed of the rotary heads depending on the tape transport speed. Such a case arises when a high speed playback is intended.

When the head rotation speed is changed depending on the speed of the playback, the following problem arises. The track-tracing control is made by, for instance, comparing an tracking error among signals obtained during a preceding scanning period with those in the present scanning period, and by correcting a driving signal for a head adjusting actuator by utilizing the above-mentioned comparison signal. This same sequence is carried out successively. FIG. 19 is a schematic pattern showing a typical track bending of a recorded tape. As shown in FIG. 19, bending of several tracks in one area generally have a correlation with each other, and tracking error information between the same scanning phases are almost the same as each other, and therefore need only little change. The vertical direction in FIG. 19 is considered to represent phase. Theoretically the same phases lie on the same vertical positions in the drawing. Accordingly, in carrying out tracking error adjusting control, it is necessary that the phases of preceding scanning points and the present scanning points agree with each other. If the phases of neighboring scannings do not agree, tracking error information at the scanning points to be compared (for instance, the scanning points $S_{61}$ on a track 410 and a scanning point $S_{61}$ on the adjacent track 411) makes a relatively large difference therebetween. Therefore, the tracking error information fluctuates in consecutive scanning. As a result, not only is the controlling accuracy low, but also the stability of the control system becomes poor. Hereupon, when the track error information is sampled at predetermined time intervals, the phases of the sampling points on the tape shift when the rotation speed of the head changes. In FIG. 19, respective Δ marks and o marks show sampling points when the original sampling points when the original sampling points $S_1$, $S_2$, $S_3$, ... lead or lag as a result of changing of the rotary heads.

On the other hand, the x marks show sampling points in the standard playback speed. The sampling points are disposed at uniform intervals from the beginning points to the end point of each scanning line in the case of the standard speed playback, which is schematiclly shown on track 410 in FIG. 19.

On the other hand, Δ marks lying on another track 411 schematically hypothetically show respective sampling points in a reverse playback case. In the reverse playback, distances between respective adjacent sampling points on the tape decreases equivalently, since relative rotation speed of the heads is reduced. Therefore, if the same sampling number is used in the track, sampling is finished at a point $S_{82}$ of FIG. 19, which lies considerably before the end of the scanning track. Therefore, tracking adjustment control after that point becomes impossible.

Sampling points shown by o marks on the track 412 hypothetically show sampling points of high speed playback in the forward direction. In the forward high speed playback mode, the distance between the sampling points increases equivalently, because the relative rotation speed of the head is increased. Therefore, the last sampling points increase equivalently, because the relative rotation speed of the head is increased. Therefore, the last sampling point $S_{83}$ is outside of the scanning track. As a result, the tracking error adjusting at the final sampling point is not carried out satisfactorily. Therefore, the track-tracing control is not satisfactorily carried out when the playback speed returns to the standard speed.

As a conclusion, the above-mentioned changes of equivalent distances between the sampling points results in providing erroneous information on the curved tracks, hence inducing poor tracking control.

The above-mentioned conventional example has still another problem. That is the problem of difference from a tape speed, the standard tape speed being one that recording and playback are based on. Such a difference arises when the VTR used for recording and that used for playback are not identical, or in a similar case. Such difference may occur due to a difference in diameter of the capstan for driving the tape and the like reason. When such an error is not material, it is possible to drive the recorded tape in the playback mode at the same transporting speed as that of the recording by appropriately changing the speed error signal by utilizing the tracking error signal. This compensates for the difference, to equivalently obtain the standard recording speed. In such a case, the error of the tape transporting speed from the standard speed is adjusted using the tracking error signal, and therefore the tracking error signal is shifted from a central value by an extent to correspond to the difference of speed. Such shift of the tracking error signal induces another problem, however, that because the tracking error signal is used also for the head actuator servo controlling for adjusting the head position for tracking purposes, the head position adjustment by the head actuator is adversely influenced by the existence of the DC component which is proportional to the shift of the standard speed. A motor control circuit offsets for DC components other than those produced by the shift of the standard speed. In general, piezoelectric devices are used as the head actuators, and impressing the DC component for a long time thereon shortens the lifetime of the head actuator, and furthermore deteriorates its characteristic. Therefore, such impression of the DC component should be avoided.

Still another problem is that the lock range of tracking control in the high speed playback case becomes narrow due to the following reasons. When the shift or variation of the tape transporting speed from the standard speed further increases, the tracking error signal should further vary from its central value. Here, let us consider the maximum adjustment ratio of standard speed, which is a ratio of maximum change of the standard speed corresponding to maximum tracking error. The below-mentioned relation exists between the maximum adjustment ratio Rmax of standard speed, which is defined by a frequency of frequency generator of the motor, and the ratio N of playback speed to standard speed as:

$$R_{max} \alpha 1/N.$$

The above-mentioned relation holds because, in an N-times speed playback, the standard period becomes 1/N, and the maximum adjustment ratio Rmax for the standard speed resultantly increases by a factor of N-times. Therefore, the sensitivity of the speed comparator becomes $1/N^2$ of the other case. Although a tracking control can be made for speed shift of up to for instance 10% in a one-time speed playback, a playback to be carried out in 5-times speed playback allows the tracking control only to a speed shift of up to 2%. Thus, the margin of tracking control becomes narrow in the high speed playback case.

As mentioned above, since the above-mentioned head drum rotation control, the tape transporting speed control and the tracking control cannot be independent of each other, if the control systems are constituted as individual circuits, many signals must be issued and received, and the circuit configuration becomes very complicated to achieve satisfactory control.

SUMMARY OF THE INVENTION

The purpose of the present invention is to overcome the above-mentioned shortcomings, and to provide an improved video tape recorder capable of attaining accurate tracking control even during special effect playback such as reverse playback and fast forward playback.

Another object of the present invention is to provide an improved video tape recorder having a simplified hardware configuration by adopting a common microprocessor wherein rotation control of the rotary heads, tape transporting control and tracking control are carried out by one processor using a time-share scheme.

Still another purpose of the present invention is to provide an improved video tape recorder which has a wide lock range for tracking control.

The video tape recording apparatus in accordance with the present invention is a tape recording playback apparatus which is for recording and reproducing information signals as a group of discontinuous recording tracks on a recording tape which is to be driven to be wound helically around a cylinder provided with a rotary write/read head mounted on a position adjusting electromechanical transducer. This device has a tracking error signal circuit for producing a tracking error signal for tracking control, based on a playback signal obtained from the rotary write/read head, first means for generating a first pulse signal at every 360°/n of rotation where n is a positive integer of the write/read head, second means for generating a second pulse signal at every one rotation of a tape transporting capstan, third means for operating a head rotation speed based on the first pulse signal, fourth means for operating a capstan rotation speed based on the second pulse signal, fifth means for producing a first speed error signal by comparing the head rotation speed with a signal of standard speed of head rotation, sixth means for producing a second speed error signal by comparing the capstan rotation speed and a capstan rotation speed standard signal, and means for carrying out selective operations, in a time sharing scheme, of first operation for producing and issuing a head rotation speed control signal based on the first speed error signal, a second operation for producing a capstan rotation speed control signal based on the second speed error signal and a third operation for producing the tracking control signal for controlling the electromechanical transducer for tracking based on the tracking error signal, the selective operation being controlled by the first pulse signal.

Further, the video tape recording apparatus in accordance with the present invention defines a tape recording-playback apparatus, which is for recording and reproducing information signals as a group of discontinuous recording tracks on a recording tape which is would helically around a cylinder provided with a rotary write/read head mounted on a position adjusting electromechanical transducer, the adjustment being in a direction vertical to the recording tracks. This device includes tracking error signal circuit for producing a tracking error signal used for tracking control, based on a playback signal obtained from the rotary write/read head, first means for generating a first pulse signal at every 360°/n of rotation where n is a positive integer, of the write/read head, and another means for producing the tracking control signal for controlling the electromechanical transducer for tracking, based on the tracking error signal, the operation being made in synchronism with the first pulse signal.

Still another aspect of the invention defines a video tape recording apparatus, which is for recording and reproducing information signals as a group of discontinuous recording tracks on recording tape which is wound helically around a cylinder provided with a rotary write/read head mounted on a position adjusting electromechanical transducer. The device has a tracking error signal circuit for producing a tracking error signal for tracking control, based on a playback signal obtained from the rotary write/read head, first means for generating a first pulse signal at every 360°/n of rotation where is a positive integer of the write/read head, second means for generating a second pulse signal at every one rotation of a tape transporting capstan, third means for controlling the head rotation speed based on the first pulse signal, fourth means for controlling the capstan rotation speed based on the second pulse signal, fifth means for producing a first speed error signal by comparing the head rotation speed with a signal indicative of a standard speed of head rotation, sixth means for producing a second speed error signal by comparing the capstan rotation speed and a capstan rotation speed standard signal, and means for carrying out selective operations, in a time sharing basis, including a first operation for operating and issuing a head rotation speed control signal basing on the first speed error signal, and a second operation for operating and issuing a capstan rotation speed control signal based on the second speed error signal, the selective operation being controlled by the first pulse signal.

DESCRIPTION OF THE PREFERRED EMBODIMENTS

Figure 1:
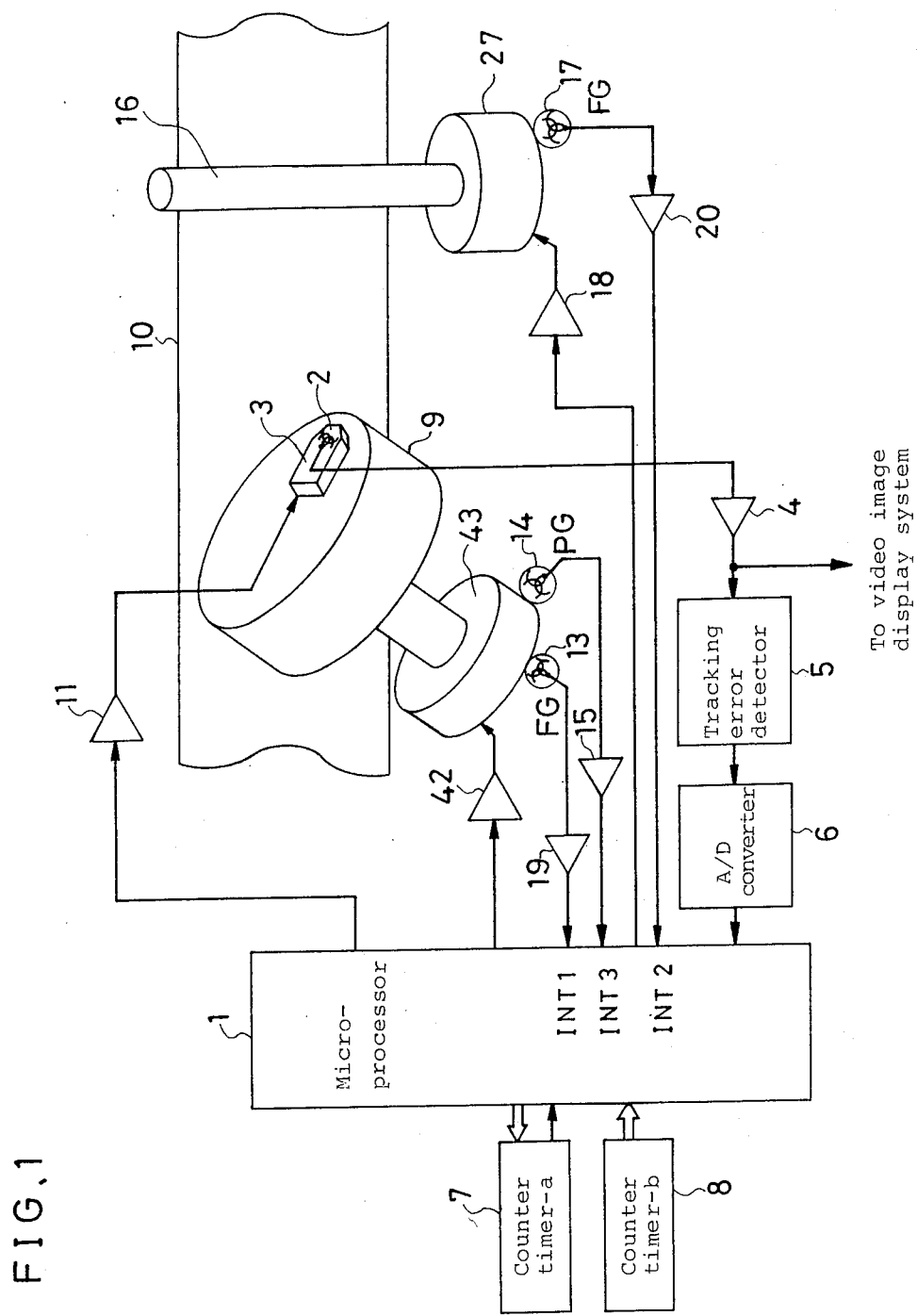
FIG. 1 is a block diagram showing one embodiment of the present invention.

FIG. 1 shows a general configuration of a preferred embodiment of the present invention. As shown in FIG. 1, an output signal of the frequency generator 13, which is provided on a rotary head drum 9, is amplified by an amplifier 19 and then provided to a first external interrupt terminal (INT 1) of a microprocessor 1, which is for instance an MN18882 made by Matsushita Electronics Corporation. The microprocessor 1 calculates a head drum driving signal for controlling the head drum 9, based on the input signal from the amplifier 19. This signal is provided to a driving circuit 42 to control the rotation speed of the rotary head drum 9. Frequency generator 17 is provided on a capstan 16, and the output signal is given to an amplifier 20, the amplified output being provided to a second external interrupt terminal (INT 2) of the microprocessor 1.

On the other hand, a tracking error detector 5 receives a reproduced signal from rotary head 2 through an amplifier 4, to issue a tracking error signal, which is then converted to a digital signal by an A/D converter 6, and is input to the microprocessor 1. A capstan driving signal is produced in the microprocessor 1, by processing these input signals, and given to a capstan drive circuit 18, whose output drives the capstan motor 27.

The capstan motor 27 carries out phase control for the tape transport (tracking control). The tracking error signal is also used for carrying out head position control for tracing curved track using the head actuator 3. Therefore, the microprocessor 1 issues a driving signal for the head actuator 3 based on the tracking error signal. The driving signal is amplified using a driving circuit 11, and fed to the head actuator 3, which is an electromechanical actuator, for instance, a piezoelectric device. The output signal of the rotation phase detector 14 provided on the rotary head drum 9 is inputted to a third external interrupt terminal (INT 3) of the microprocessor 1 through an amplifier 15. Therefore, the microprocessor 1 also obtains rotation phase information from the rotary head 2. Furthermore, there are two counter timers belonging to the microprocessor 1. A counter timer-a 7 changes its count period depending on commands from the microprocessor 1, and interrupts the microprocessor 1 as a timer interrupt at every overflow. On the other hand, a counter timer-b 8 belonging to the microprocessor 1 always counts clock signals (for instance, clock signals for driving the microprocessor 1), and the microprocessor 1 can read out the count value at any time. The interrrupt caused by the counter timer-a 7 is used to compute a timing of rotation control of the rotary head drum 9 and as a compensation filter 41 in tape transport control, and further, for providing timing for sampling of the tracking error signal and the drive command for the head actuator 3. On the other hand, the counter timer-b 8 is used as a timebase, and the frequency generators 13 and 17 are used for measuring the rotation speed.

In the above-mentioned constitution, only one rotary head 2 is shown for simplification. As is standard in VTRs, another rotary head (not shown) is disposed on the opposite side against the rotation shaft on the rotary head drum 9. The rotary head 2 serves as, at least, a reproducing head. However, conventional video reproducing apparatus have at least two rotary heads which serve as reproducing heads.

Figure 2:
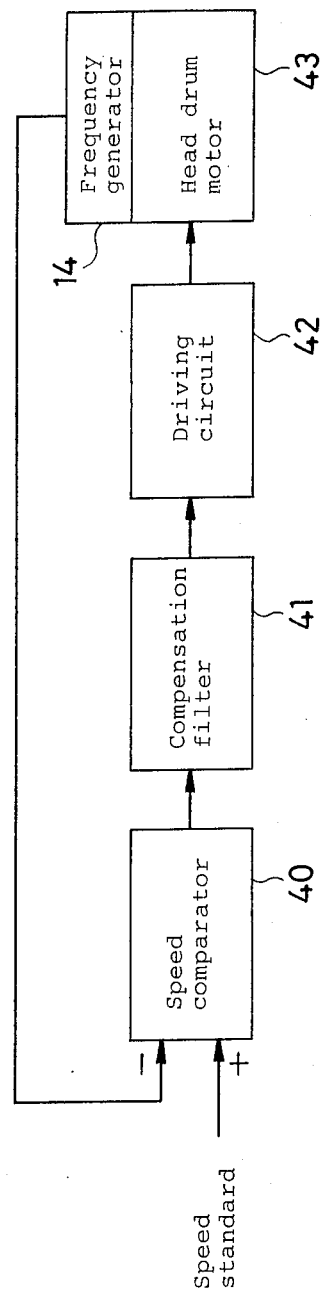
FIG. 2 is a block diagram showing a rotation control system of a rotary head drum of the embodiment.

FIG. 2 is a block diagram showing a configuration of the speed control system of the head drum rotation of the embodiment. FIG. 2 shows frequency generator 14 provided on the head drum motor 43, which produces a head drum motor speed to be inputted to a speed comparator 40. A speed standard, for instance a value read out from a memory, is also inputted to the speed comparator 40, which issues a speed error signal and couples it to a compensation filter 41. An output of the compensation filter 41 is connected to a drive circuit 42 which drives the head drum motor 43. The above-mentioned servo loop performs a rotation speed control of the head drum motor 43.

Figure 3A:
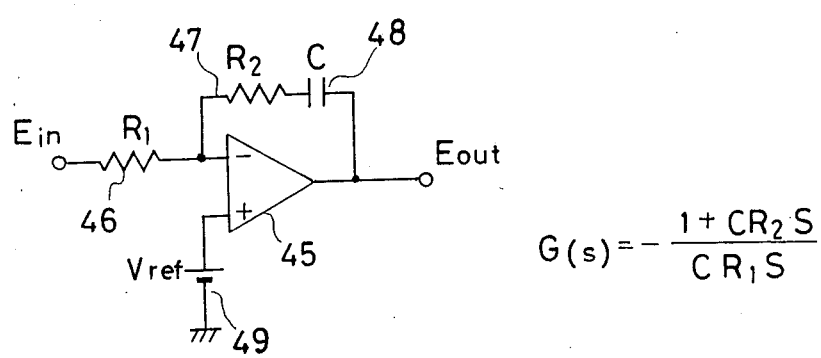
FIGS. 3A and 3B are a block diagrams showing a constitution of a compensation filter of the embodiment.

FIG. 3(a) is a circuit diagram of one example of the compensation filter 41. This circuit is a known as an integral type filter. The transfer function of this filter is given s follows:

$$G(s) = -\frac{1 + CR_2 S}{CR_1 S}, \quad (1)$$

wherein C is a capacitance of the capacitor 48, $R_1$ and $R_2$ are resistances of the resistors $R_1$ and $R_2$, and S is the symbol for a Laplace operator.

This combination filter has a larger gain in the low frequency range, and at DC the gain becomes infinity. Therefore, by using such a filter, an external suppression characteristic in low frequency range is improved, and a system without stationary deviation is obtainable.

Figure 3B:
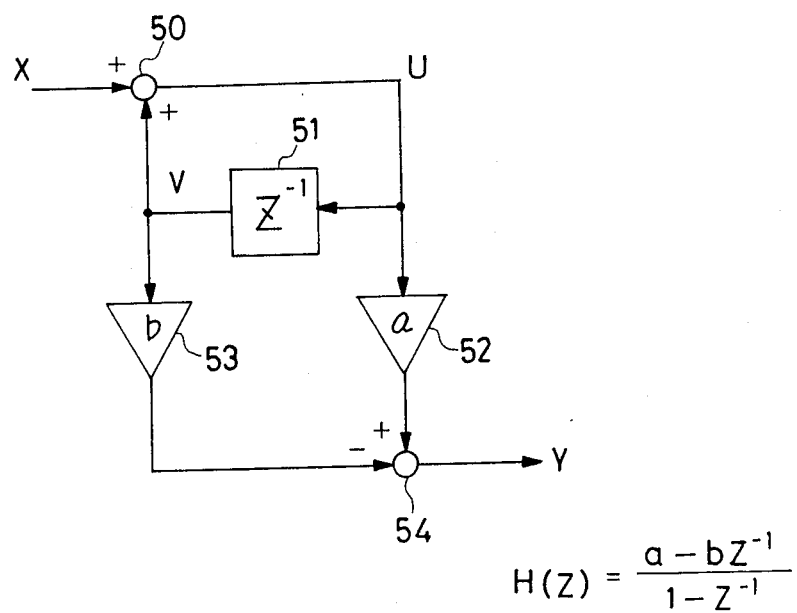

FIG. 3(b) is a diagram showing the filter of FIG. 3(a) in a discretionary time scheme by an approximation method. By using such a discretionary time method, processing by the microprocessor 1 becomes feasible. The circuit of FIG. 3(b) is constituted as a bi-linear approximation. This is obtainable as a transfer function of an analog system as follows:

$$S = \frac{2(1 - Z^{-1})}{T(1 + Z^{-1})}, \quad (2)$$

wherein T is smapling period and Z is a one-sampling period advancing operator. Accordingly, in FIG. 3(b), amplification factors a and b of multipliers 52 and 53 are given as follows:

$$a = \frac{2CR_2 + T}{2CR_1} \quad b = \frac{2CR_2 - T}{2CR_1}, \quad (3)$$

In the circuit of FIG. 3(b), an accumulative summing of the input signal X is made at every sampling time by means of adder 50 and delay circuit 51. Furthermore, a product of an previous accumulated value times the coefficient B is subtracted from a product of the present accumulated value times the coefficient A, and a resultant value Y is obtained. This summarizes the operation of the filter. Such operation of the filter is carried out for both of the rotary head drum and the capstan 16, and the resultant outputs are provided to the driving circuit for the respective device.

Figure 4:
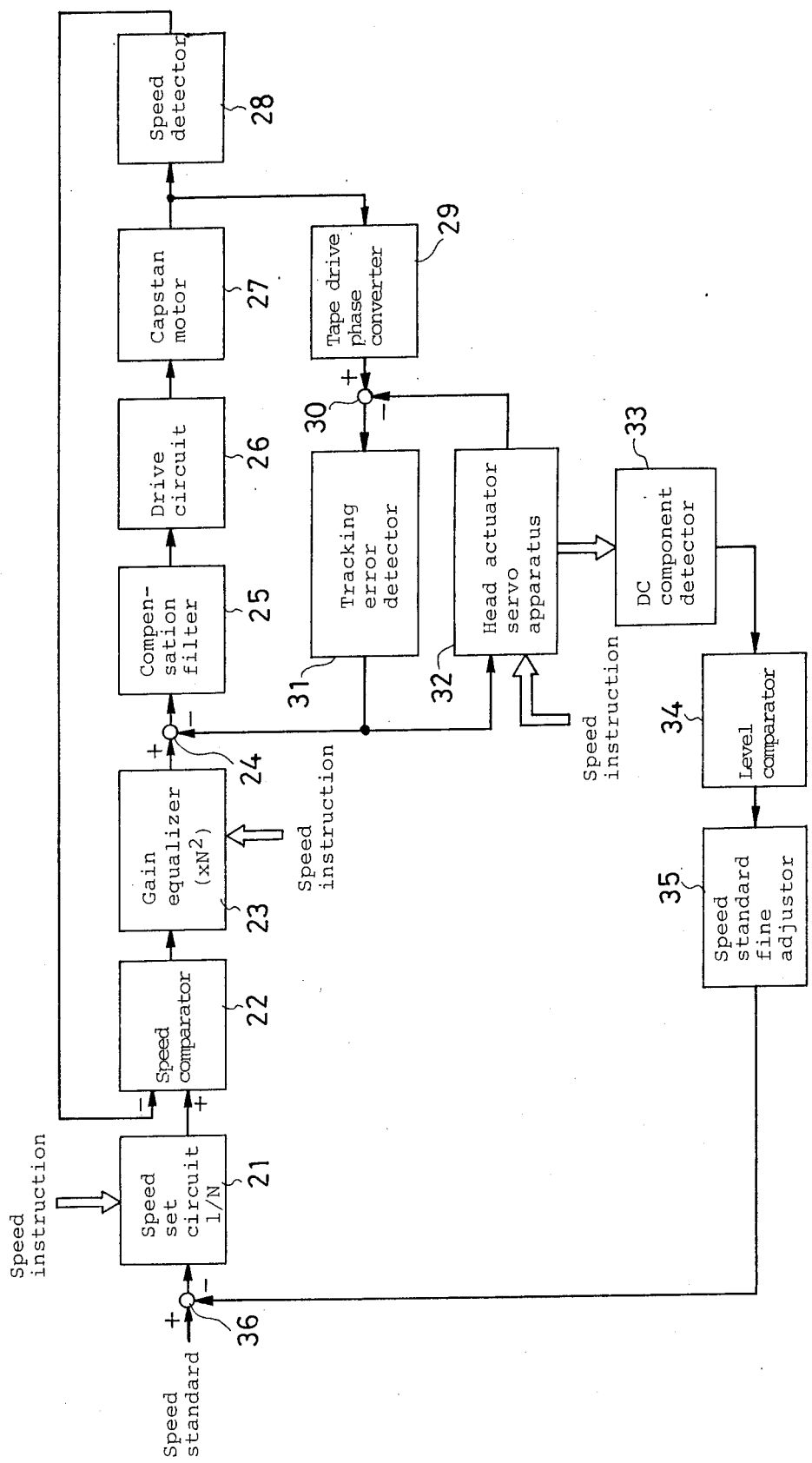
FIG. 4 is a circuit diagram of a tracking control circuit of the embodiment.

FIG. 4 is a block diagram showing the circuit configuration of the phase control system for tape transporting and the track tracing control system of curved tracks. The speed standard value, which is the same as that for recording, is input through a summing point 36 to a speed set circuit 21. Speed set circuit 21 is a divider to divide the period of the input signal to be 1/N times the original, and to issue a signal as an actual speed standard value. The speed standard value from the speed set circuit 21, and a speed signal issued from the frequency generator 17 are provided to a speed comparator 22. The output of the speed comparator 22 is given to a gain equalizer 23 so as to control the overall control gain of the system to be constant, in order to prevent variation of the control gain responding to the speed. Thereafter, the output of the gain equalizer 23 is routed through a summing point 24, where a tracking error signal is also added, and routed to a compensation filter 25. Further, the output of the compensation filter 25 is amplified by a driving circuit 26 and given to a capstan motor 27, which drives the capstan 16. A signal indicative of motor speed from the frequency generator 17, which is provided on the capstan motor 27 is fed back to the speed comparator 22 thereby constituting a speed control servo loop. On the other hand, a signal from the capstan motor 27 is given to a tape transport phase signal converter 29 which issues a signal representing the tape transport phase. A tracking error detector 31 receives, through a summing point 30, the sum of output signals of the tape transport phase signal converter 29 and the output of head actuator servo apparatus 32. This sum represents the head displacement. That is, tracking error detector 31 issues a signal corresponding to the positional relation between the track on the tape and the head position. The tracking error detector 31 issues this tracking error signal which is routed to the summing point 24, thereby constituting a tracking control link with the capstan motor 27. The tracking error signal is also coupled to the head actuator servo apparatus 32, constituting another tracking control link with the head actuator. On the other hand, a DC component impressed on the head actuator 3 in FIG. 1 is detected by the DC component detector 33 and the output signal thereof is routed to level comparator 34, which compares the DC component level with a predetermined DC level and issues a signal to a speed standard fine adjuster 35. The speed standard fine adjuster 35 makes a fine adjustment of the speed standard value, taking the original standard speed at the recording as a reference, and determines a value of fine adjustment of speed, which is given to a summing point 36 thereby to correct the speed standard.

Figure 5:
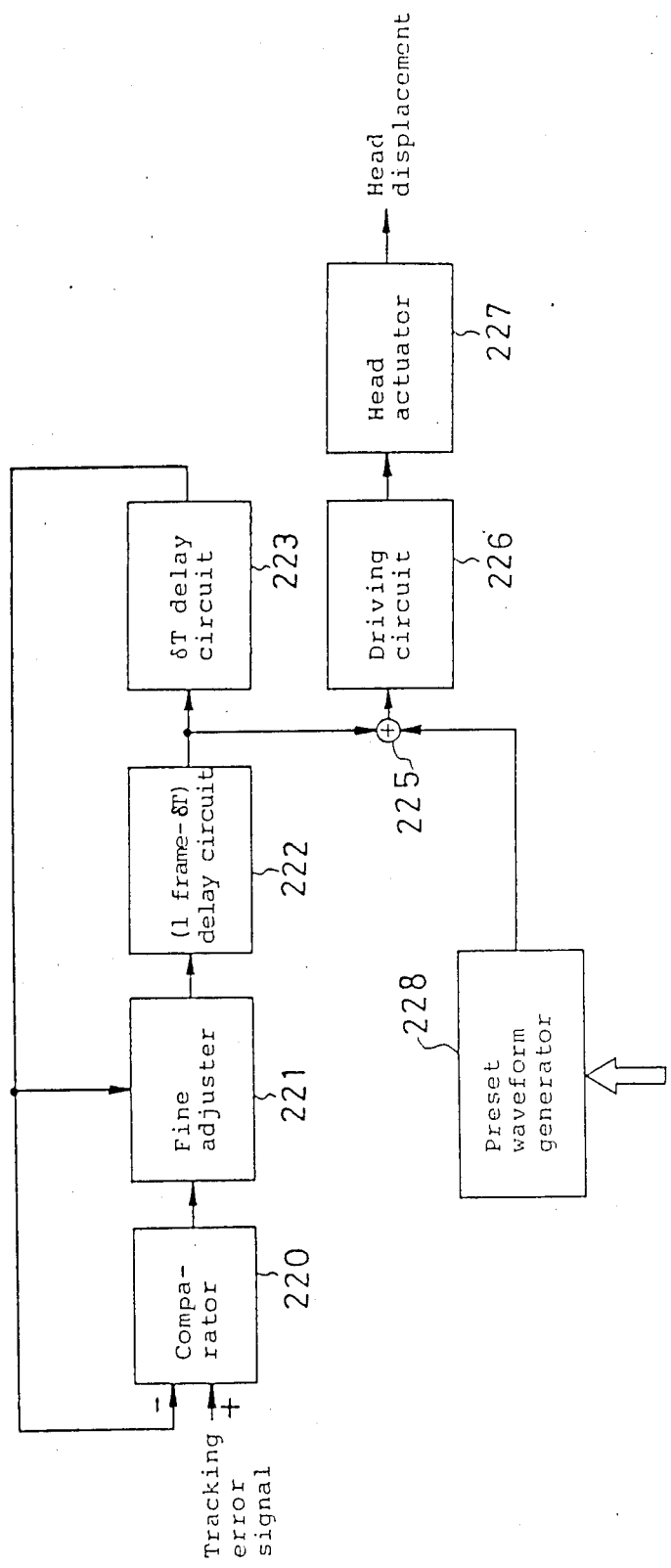
FIG. 5 is a block diagram of a control circuit of the head actuator.

FIG. 5 is a block diagram showing a configuration of the head actuator servo apparatus 32 of FIG. 4. A comparator 220 is provided for comparing the tracking error signal with the output of a $\delta T$) delay circuit 222. The (1 frame$-\delta T$) delay circuit 222 issues its output to the $\delta T$ delay circuit 223 and to a summing point 225, which gives a summed signal, which is a sum of the output of the (1 frame$=\delta T$) delay circuit 222 and a preset wave form generator 228 at driving circuit 226. The driving circuit 226 output drives th head actuator 3, thereby making the necessary displacement of the rotation head 2. The output of the fine adjuster 221 is delayed by a period of 1 frame and fed back to the comparator 220, and therethrough returns to the fine adjuster 221. The circuit is designed to take out the signal from the (1 frame$-\delta T$) delay circuit, so as to compensate for phase delay by means of the output from the driving circuit 226 and the head actuator 3, without passing through the $\delta T$ delay circuit 223.

Now, the opertion of the preset waveform generator 228 of the circuit of FIG. 5 will be elucidated in detail. The preset waveform is used to prevent an undesirable phenomenon. Specifically, when a recorded tape is intended to be reproduced at a speed which is different from the recorded speed, the head may scan obliquely, crossing the tracks even though there is no curving of the tracks. Because a speed control signal is given through the preset waveform generator 228, through the drive circuit 226, and to the head actuator 3, the tracking error signal obtained from the tracking error detector 31 of FIG. 4 contains information about tape transport phase error and information of track bending only. Therefore, the tracking error signal will have the same meaning at any reproducing speed.

Figure 6:
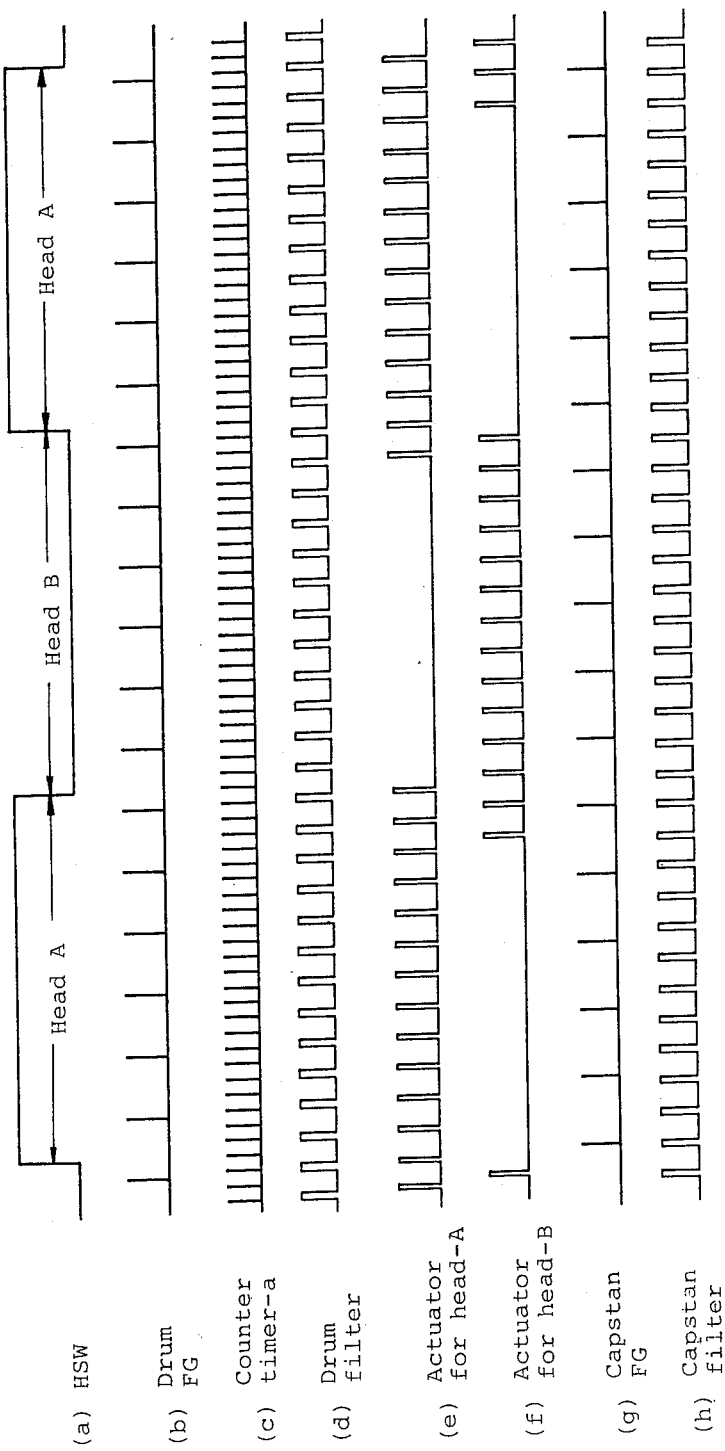
FIG. 6, consisting of (a) through (h), is a timing chart illustrating operations of various parts of the embodiment.

FIG. 6 is a timing chart showing a timing relation between various parts, to show a time sharing operation of the parts, Frequency generator 13, provided in the head drum motor 42, produces twelve pulses (pulses (b) of FIG. 6) per one rotation (1 frame). The timer interrupt is made at a frequency of 4-times this frequency, namely, 48-times per 1 frame as shown by pulses (c) of FIG. 6. A sampling frequencies of the filters for the drum control system of the rotary head and the capstan control system are selected as 24-times of respective frame frequencies (respectively as shown by (d) and (h) of FIG. 6;) and a sample frequency of the track tracing control is 2-times the frequency of the timer interrupt (as shown by waveforns (e) and (f) of FIG. 6). Hereupon, in order to enable simultaneous controlling of the actuator for head A and the actuator for head B, the sampling intervals of both actuators are made in synchronism with the timer interrupt. By using such a setting, respective operations can be processed at a sufficient speed of the microprocessor without superposition. Also, the pulses of capstan frequency generator 17 shown by the waveform of (g) of FIG. 6 are not synchronized to the drum rotation, and hence, only this part has a possibility of being superposed with other processing. But even this case does not materially influence the processing operation, because processing for the input pulse is only an operation of speed comparison and the process is finished in a sufficiently short time.

Figure 7:
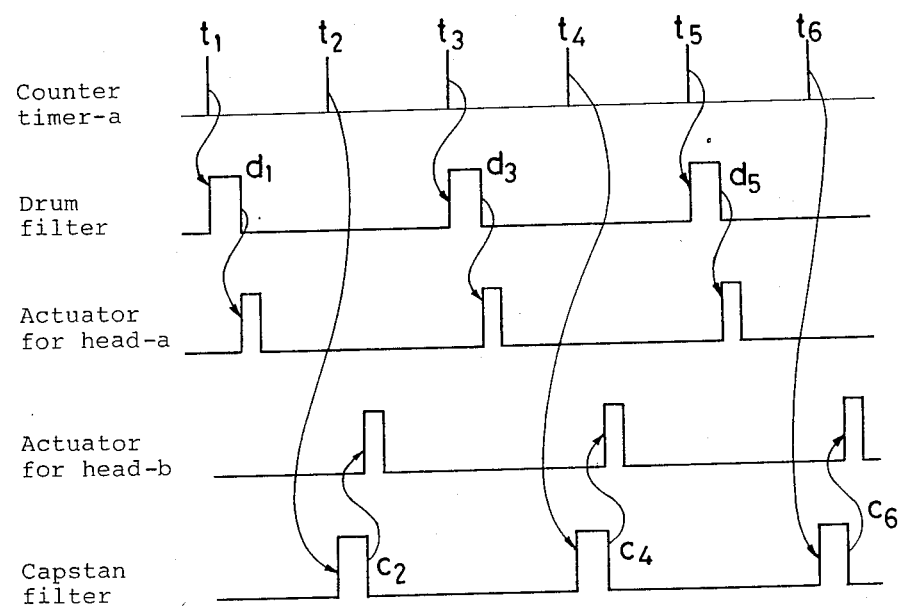
FIG. 7 is a detailed timing chart used for a more detailed explanation of operation of the embodiment.

FIG. 7 is an enlarged time chart of a part of FIG. 6 to show the detailed relation thereof. When the timer interrupts $t_1$, $t_3$ $t_5$, . . . occur, the microprocessor 1 performs a filter processing of the drum control system. When the filter processing is finished, (at the timing of $d_1$, $d_3$, $d_5$ or . . . ) control of the actuator for head A is carried out. When the processing of the control signal for the actuator for head A is finished, the time interruption processing is finished. When the timer interrupts $t_2$, $t_4$, $t_6$ . . . are inputted, the microprocessor 1 processes the filtering for the capstan control system. When the filter processing is finished, (at the timing points of $c_2$, $c_4$, $c_6$ or . . . ) the processing of the head actuator for head B is carried out. When the signal processing for controlling of the head actuator for head B is finished, the timer interrupt processing is finished. In such a manner, even though the same time interrupts are used, alternate processing of respective head actuators for respective heads, and processing for their filter, are made.

FIG. 8, FIG. 9, FIG. 10, FIG. 11, FIG. 12, FIG. 13, FIG. 14 and FIG. 15 are flow charts showing the contents of the processing occurring in the microprocessor 1.

Figure 8:
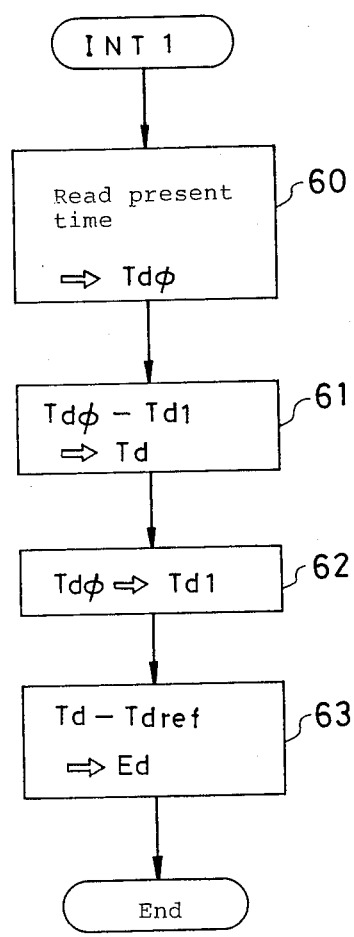
FIG. 8 is a flow chart showing comparison processing of head drum speeds.

FIG. 8 is a flow chart showing the first interrupt by the frequency generator 13 provided on the head drum motor 43. During the interrupt processing, in a first step 60, the present time of the counter timer-b 8 is read and stored as a read value in a memory Td0. Since the counter timer-b 8 is continuously operating, a measure of the point of time is read at this step 60. In the next step 61, a previously memorized time Td1 is subtracted from the above-mentioned present time Td0, to produce a period of the pulse signal, which is then sorted in a memory Td. In the next step 62, the present time memory Td0 is transferred to a memory Td1. In the next step 63, the standard pulse period value Tdref is subtracted from the pulse period value Td, thereby to produce period difference, which is then stored in a memory Ed. This value corresponds to the speed error signal. This flow represents the interrupt processing by the pulse signal of the frequency generator 14 provided on the rotary head drum 9. As a result, a speed error signal is obtained, and this process is represented by the speed comparator 40 in FIG. 2.

Figure 9:
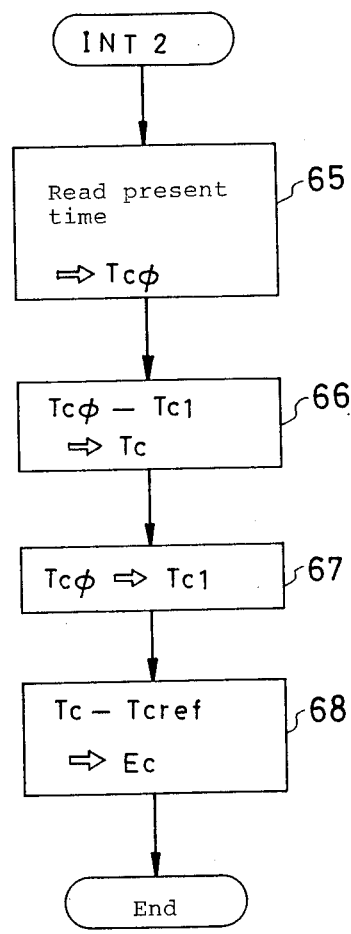
FIG. 9 is a flow chart showing a comparison processing of capstan speeds.

FIG. 9 is a flow chart showing the steps of the second interrupt processing by the output signal of the frequency generator 17 provided on the capstan motor 27. In the first step 65, the present time is read in the counter timer-b 8 and the value is stored in a memory Tc0. In the next step 66, the value of a preceding time Tc1 is subtracted from the value of the present time Tc0, thereby to produce a pulse period of the frequency generator 17, which is sorted in a memory Tc. In the next step 67, the value of the present time Tc0 is transferred to the memory Tc1. In the next step 68, a standard pulse period Tcref is subtracted from the pulse period value Tc, thereby to produce a frequency error, which is then sorted in a memory Ec This value is also considered as a speed error signal similar to the case of FIG. 8. The above is the interrupt processing by the pulse of the frequency generator 17 of the capstan motor, and as a result of the above-mentioned processes, the speed error signal is obtained. This process is represented by the speed comparator 22 in FIG. 4.

The speed comparison processing of FIG. 8 and FIG. 9 executes only two subtractions and two memory transfers, and therefore the execution time of these programs are sufficiently short so that they do not substantially hinder other processing.

Figure 10:
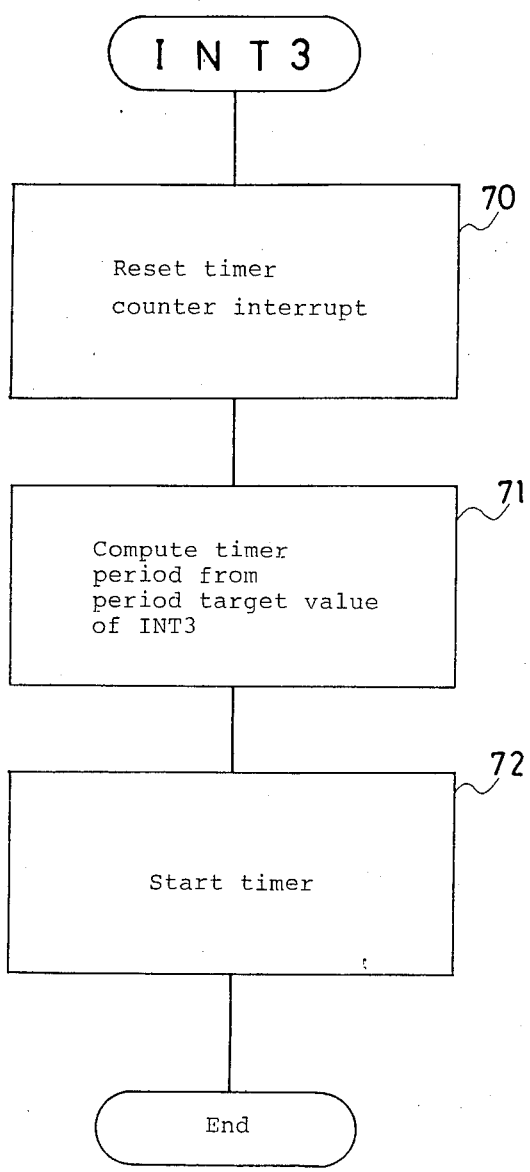
FIG. 10 is a flow chart showing signal processing of rotary head rotation phases.

FIG. 10 is a flow chart showing the steps of the second interrupt processing of pulses from the phase detector 14 provided on the head drum motor 43. The signal from the phase detector 14 provided n the drum motor 43 shows at what angular position the rotary head 2 lies. Switching of the rotary head 2 is made based on this signal. In a first step 70, a timer interrupt counter-a 7, which is contained in the microprocessor 1, and which operates alternate filter operation for the drum filter and the capstan filter, is reset. This corresponds to the reset counting in FIG. 7 in counting as $t_1$, $t_2$ $t_3$ . . . . In the next step 71, the interrupt period of timer-a 7 is computed from a target rotation period of timer-a 7 computer from a target rotation period of the rotary head drum 9 (at a selected reproducing speed). In this embodiment, a period of 1/48 of the drum rotation period is computed. This may be prepared in a shape of a table as shown, for instance, in FIG. 15 as 106. This processing is not necessarily done by the interrupt processing, but may be executed in an interrupt waiting state. One example thereof will be described later with reference to FIG. 15. In the next step 72, the counter timer-a 7 is started into a counting mode. The above-mentioned routine summarizes the processing-after-interrupt by the pulse generator signal. This process is for synchronizing various processes to the rotation of the rotary head drum 9.

Figure 11:
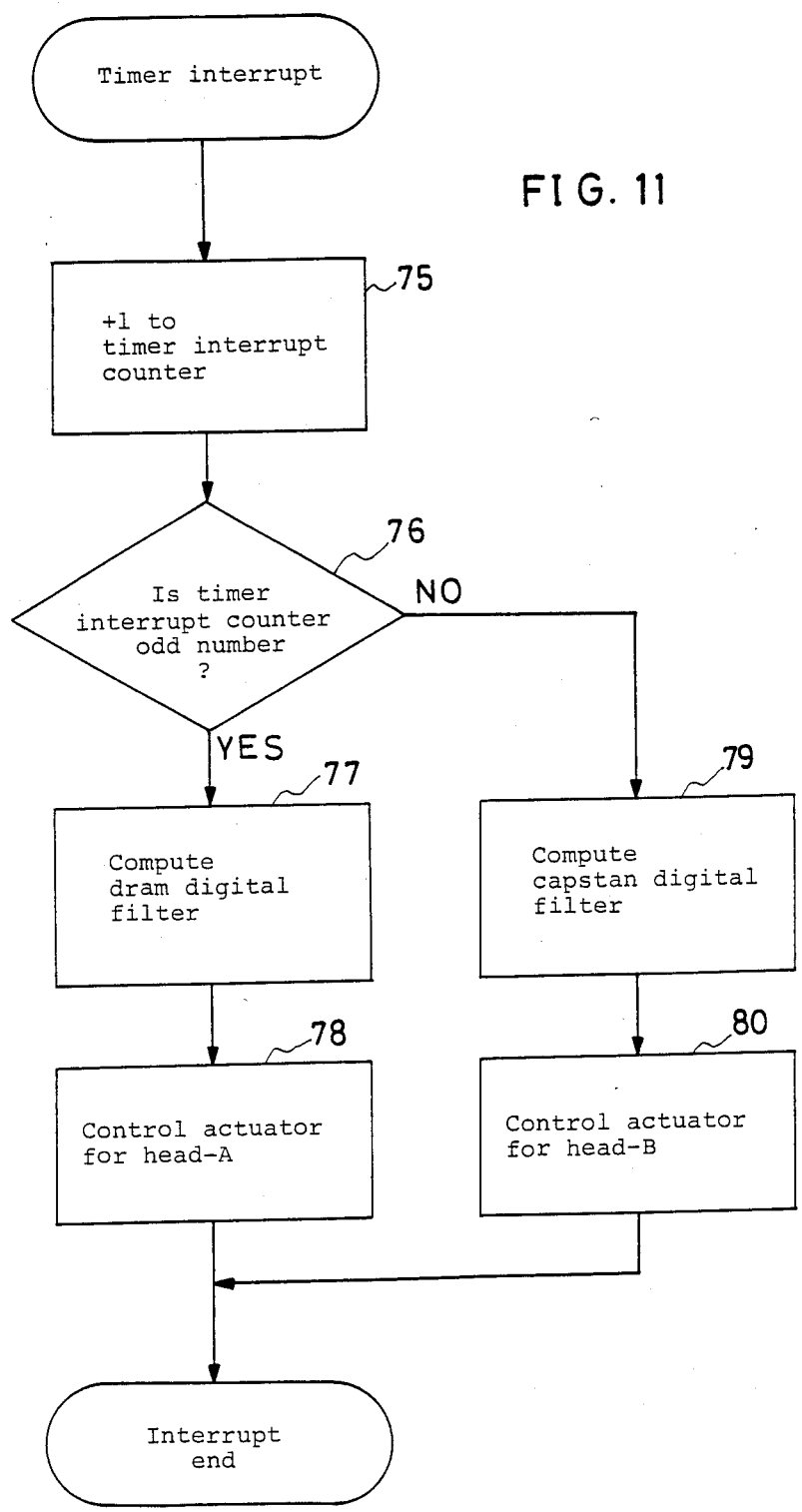
FIG. 11 is a flow chart showing time-interrupt processing.

FIG. 11 is a flow chart showing an outline of the interrupt processing of the counter timer-a 7. In the first step 75, the number of times of timer interruption is counted. That is, +1 is added to the timer interruption counter A. In the next step 76, the counter value is examined to determine whether it is an odd number or even number. When the number is odd, the flow proceeds to the step 77. When the number is even, the flow proceeds to step 79. That is, this decision enables alternate processing at consecutive interrupts, and same processing for every other timer interrupt. This corresponds to the parts shown by $t_1$–$t_6$ of the timing chart of FIG. 7.

At step 77, filter processing for controlling of the rotary head drum is carried out, and at the subsequent step 78, processing of a control signal for the head actuator for the head A occurs, and the interrupt process is finished. At step 79, filter processing for the capstan control is carried out, followed by step 80 at which the signal processing of the controlling of the head actuator for the head B is carried out, and the interruption processing is finished.

Figure 12:
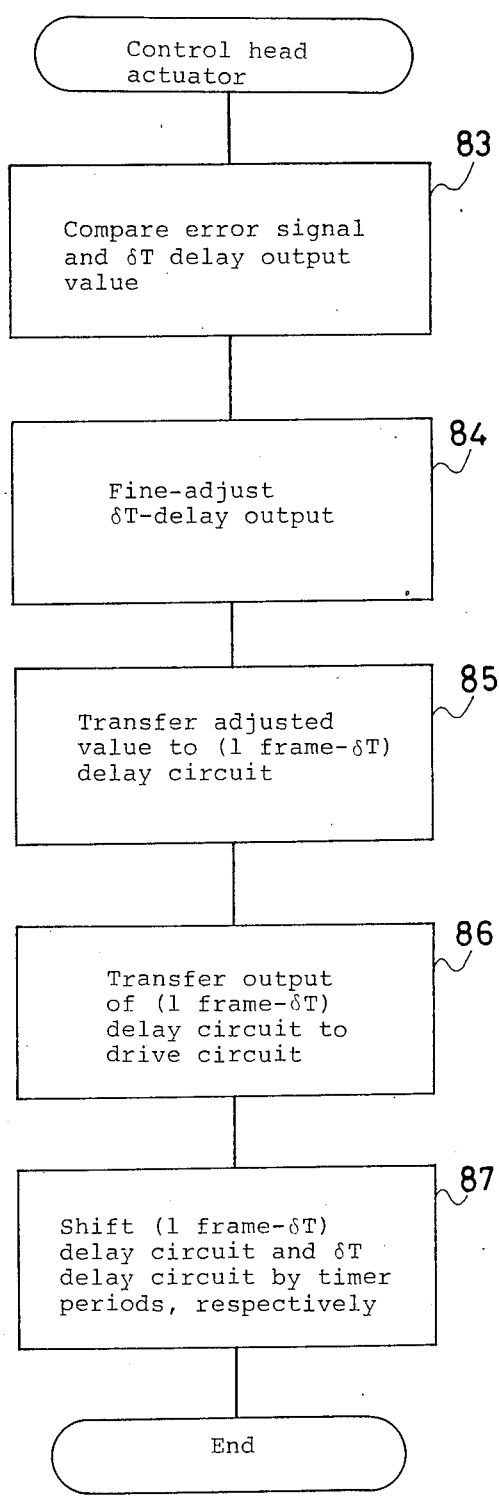
FIG. 12 is a flow chart showing control processing of head actuator at timer interrupt.

FIG. 12 is a detailed flow chart showing the signal processing of the head actuator 3, as shown in the steps 78 and 80 of FIG. 11. In this case, in the block diagram of FIG. 5, the (1 frame−δT) delay circuit 222 and the delay circuit 223 are equivalent to a kind of shift register, and the shift clock thereof has the same period as the timer interrupt period. Since a discrimination be- tween the head actuators for the A and B heads are not made, in actual use it is necessary to execute a process to discriminate from which actuator the output is added. Though in this embodiment there is no description referring to the non-contact period of the head on the tape, for such period the process can be shortened since there is no need to input the signal. In the step 83, the tracking error signal and the output value of the δT delay circuit 223 are compared. This is the operation of the comparator 220 of FIG. 5. Then, the next step 84, in accordance with the compared result of the comparison in the previous step 83, the output value of the δT delay circuit 223 is finely adjusted. For instance, this is done by the extent of smallest number handled in this program, for instance, the LSB. This is the processing by the fine adjuster 221 of FIG. 5. The value adjusted in this manner is transferred to the (1 frame−δT) delay circuit 222 in the next step 85. In the further next step 86, the output of the (1 frame−δT) delay circuit 222 is added to the output of the preset waveform generator 228, and the summed value is transferred to the drive circuit 226. In step 87, the signal of the (1 frame−δT) delay circuit 222 and the signal of the δT delay circuit 223 are all shifted by the timer period. With this, one time processing of the head actuator control is completed.

Figure 13:
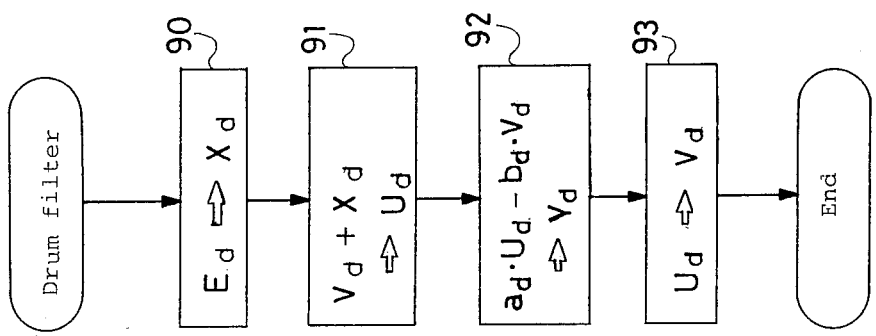
FIG. 13 is a flow chart showing operation of the compensation filter of the rotary head drum control system.

FIG. 13 is a flow chart of the detailed filter processing is shown in step 77 of FIG. 11. In the first step 90, a speed error value Ed of the rotary head drum 9 is accessed and filter input Xd, and in the next step 91 the value Xd is summed with the hitherto accumulated value Vd of the filter input and stored in a memory Ud. In the next step 92, the accumulated values Ud and Vd are multiplied by coefficients ad and bd, respectively, and a difference Yd of these two values is issued to the driving circuit 42. Finally, in step 93, the accumulated values Ud and Vd are transferred for preparation of the next processing step, to complete this time process.

Figure 14:
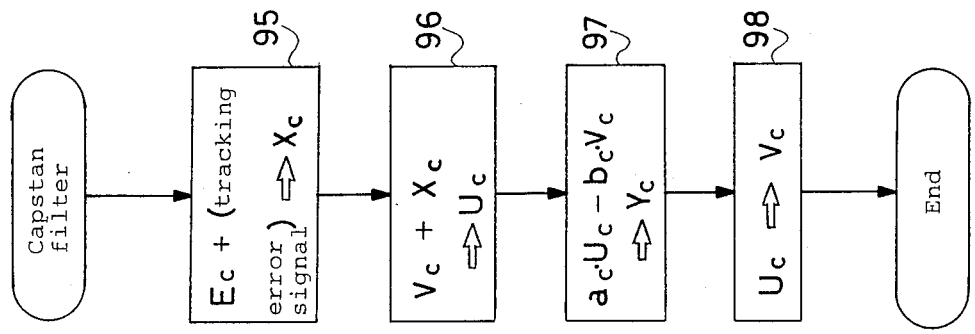
FIG. 14 is a flow chart showing operation of compensation filter of capstan control system.

FIG. 14 is a detailed flow chart showing the filter processing step 79 of FIG. 11. Since the capstan 16 needs to perform speed control and phase control, the first step 95 obtains a summed value of the capstan speed error signal Ec and tracking error signal, and inputs it to the capstan filter as its input Xc. Thereafter, in the same manner as the case of the filtering process for the rotary head drum filter, in the step 96, the hitherto accumulated value Vc and the input value Xc are summed to make a summed value Uc, and in the step 97 the two values Uc and Vc are multiplied by coefficients ac and bc, respectively, to produce two products. A difference Yc between the two products is obtained, and the difference Yc is issued to the driving circuit 18. Finally, in the step 98, the value Uc is transferred to the value Vc to prepare the next process, and the process is completed.

Next, a case where the controlling of the counter timer-a 7 is made by interrupt of the output of the phase detector 14 will be described.

Figures 15A, 15B:
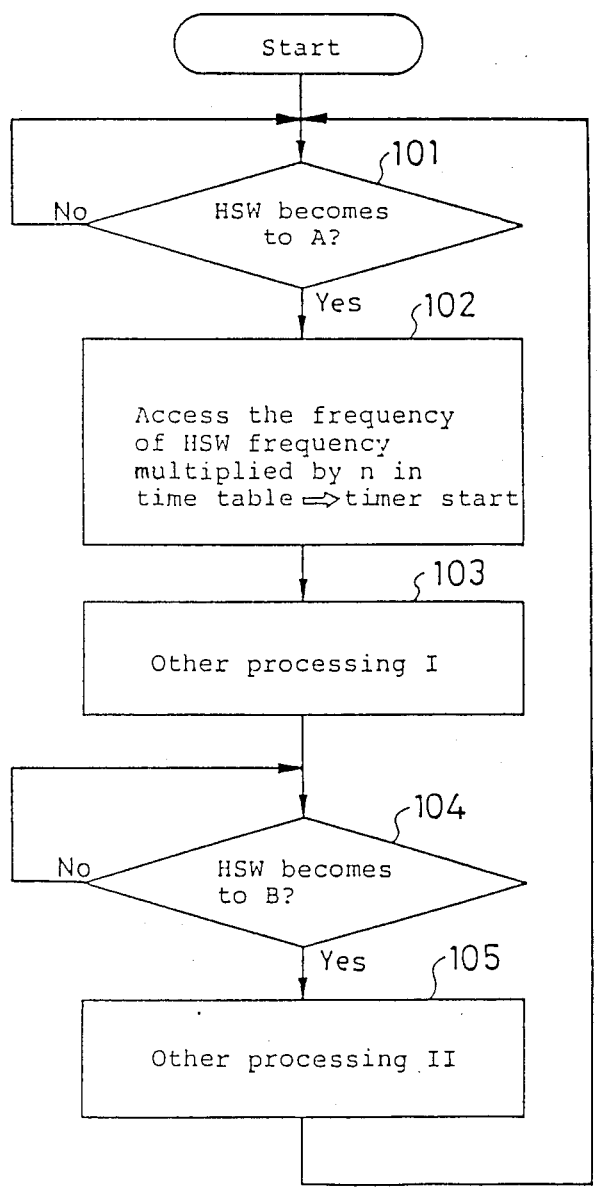
FIG. 15A is a flow chart showing another embodiment of the timer setting.
FIG. 15B shows a table used with the FIG. 15A flow chart.

FIG. 15a is a flow chart showing an outline of the processing of the microprocessor 1 and control of counter timer-a 7 which is variable. In the first step 101, a loop is executed to wait for the switching of the HSW signal (head scanning switching signal) to the side of head A. When the HSW signal is switched to the side of head-A, the processing proceeds to next step 102. In step 102, a timer having an integer times HSW frequency is accessed from a timer constant table 106, and starts the timer. The timer constant table 106 shown in FIG. 15B as a table which issues necessary timer constants when a reproducing speed command is given. Here, the example has a timer frequency of sixteen-times the frequency signal of the rotary head drum in an NTSC 8 mm video system.

Next, in the step 103, other processes are carried out for instance, computation of an optimum track for scanning for the next time, depending on the selected reproducing speed, or of what preset signal is to be selected for the selected speed, is computed. The latter described adjusting computation of the standard speed can be made. The next step 104 executes a loop to wait for the switching of the HSW signal to the side of the B-head. When the HSW signal is switched to side of the B-head, the process proceeds to the step 105, and other processing (not particularly limited, but proceeding which is to be completed until switching to side of the A-head of HSW signal) is made, and again comes back to the step 101. The microprocessor 1 of FIG. 1 repeats processes in this way.

Figure 16:
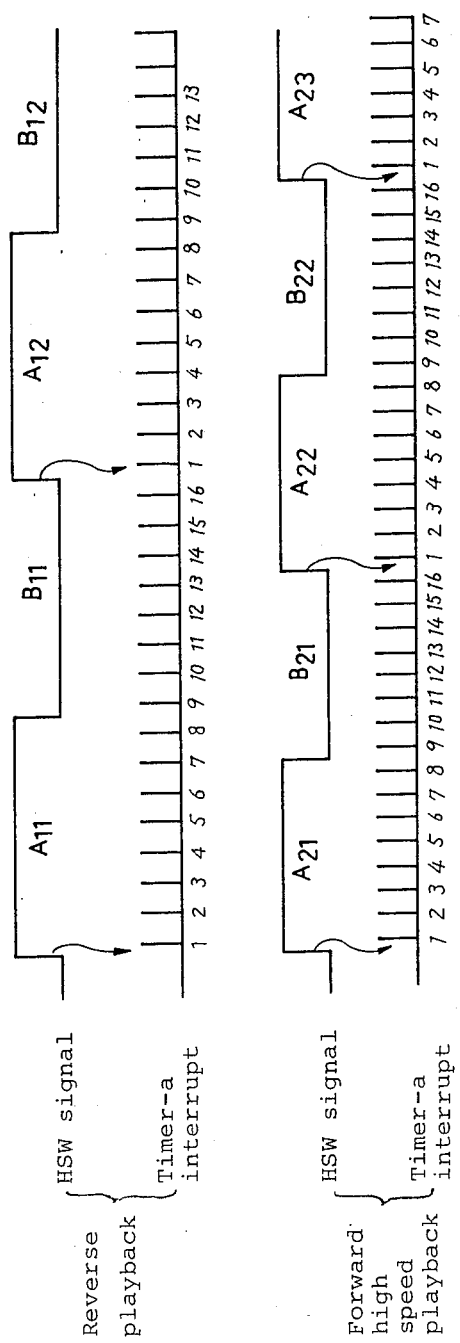
FIG. 16 is a timing chart showing relation between head switching signal and time-interrupt request signal.

FIG. 16 is a time chart showing timing of the timer interrupt and the head scanning switching signal. The upper two waveforms of FIG. 16 indicate the case when head rotation speed is relatively slow. The lower two waveforms indicate the case when the head rotation speed is relatively fast (for instance, in forward high speed reproducing). In both cases, the timer interrupt uniformly divides the scanning periods for the time of scanning by the head-A and the time of scanning the head-B. By reading the tracking error signal using this timer, the conventional problem of undesirable shifting of tracking error reading positions on the tape depending on reproducing speed can be overcome.

Figure 19:
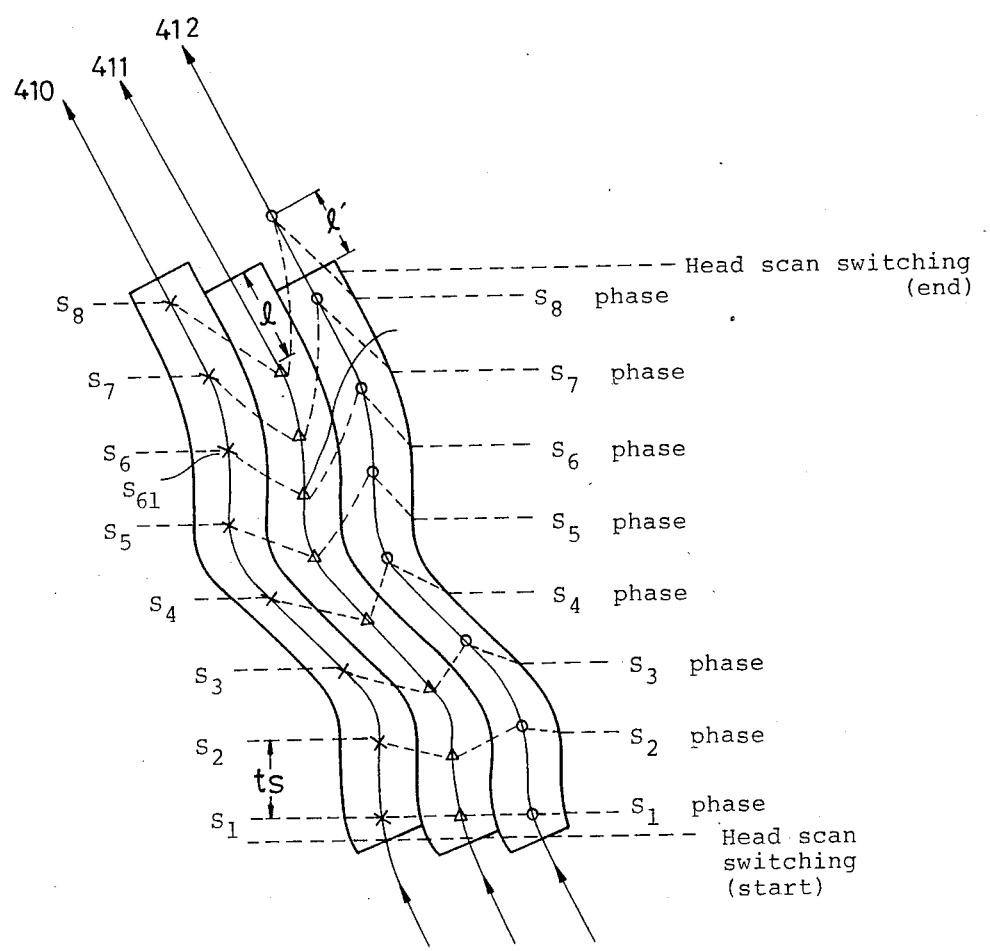
FIG. 19 is a pattern diagram schematically showing the relation between the track bending and the sampling points of various kinds of tracks thereon.

By constituting the processing sequence in the above-mentioned way, even when the reproducing speed is changed, the sampling position for the tracking error signal can be retained at the same phase position on the tracks. By utilizing this characteristic of the tracking error signal, processing is easily performed as shown in FIG. 5. That is, as shown in FIG. 19, since the track curving information for neighboring tracks has a high correlation between one other, even when a high gain feedback control is difficult due to a poor ratio of the tracking error signal, the noise can be removed by a process utilizing the aforementioned comparison and adjustment, as long as the sampling points are on corresponding phase points in neighboring tracks.

Although the timing of sampling is obtained by the counter timer-a 7, it may be any signal having a period indicative of a result of dividing a period of rotation of the head driving by an integer. For instance, sampling may be made a PLL (phase locked loop) by the HSW signal, and multiplying the HSW signal may be used, or alternatively, a rotary pulse encodeer may be provided on the rotary shaft of the head rotation drum to produce an output signal of 360°/n rotation angle of the rotary head.

Figure 17:
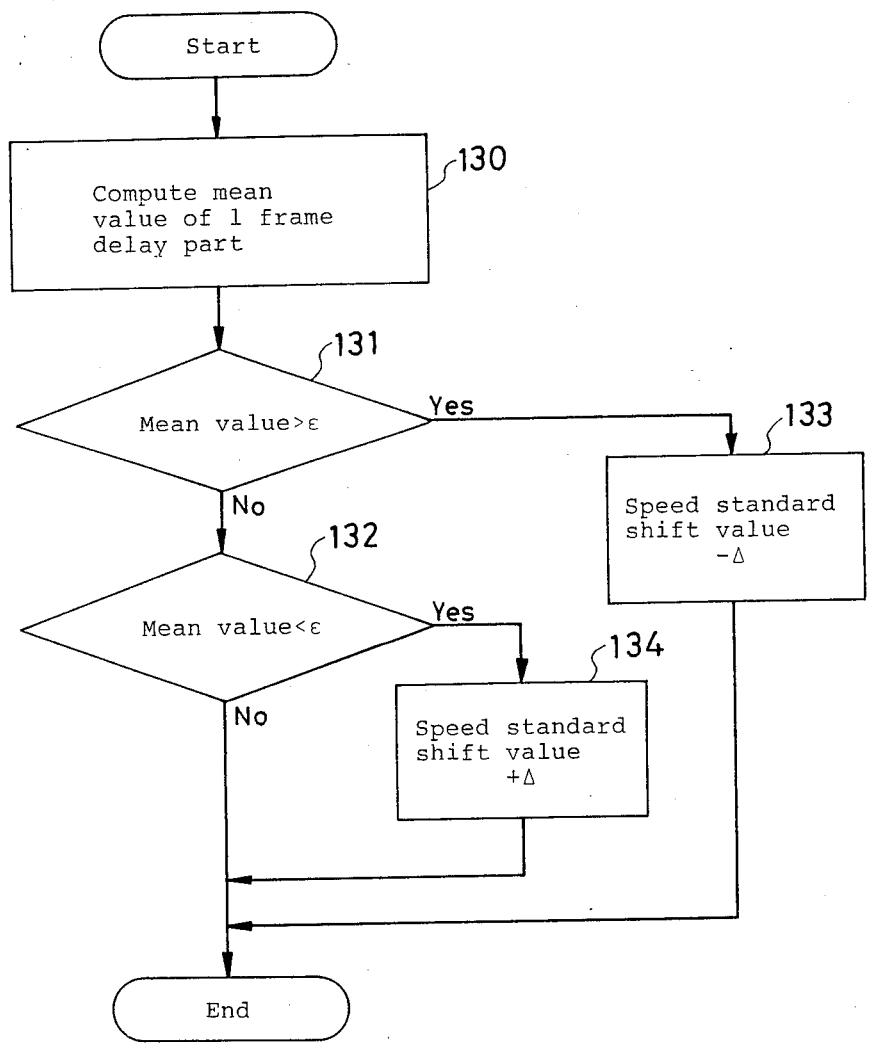
FIG. 17 is a flow chart showing a process of detecting a DC component of tracking error signal and thereby computing a collection value of speed standard of tape transport control.

FIG. 17 is a flow chart showing a process for DC component detection through level comparison and decision of fine adjusting value of the speed standard. In this flow chart, $\epsilon$ and $\Delta$ are both positive and small values. In the first step 130, a mathematical means value of respective sampling values inside the one frame delay circuit, which consists of the above-mentioned two delay circuits 222 and 223, is produced. When the mean value is larger than the small amount $\epsilon$, the step 131 determines to proceed to the step 133, thereby to make a fine-adjustment of the shift value of the speed standard by $-\Delta$. On the other hand, when the mean value is smaller than the fine value $-\epsilon$, the step 132 determines to proceed to step 134 wherein the shift value of the speed standard is fine-adjusted by $+\Delta$. When the mean value is substantially zero, no further processing is made. This process is as shown by the flow chart, and easily realized by the software. Using the above-mentioned processes, an amount of shift of the speed standard is determined. This process does not necessarily require any high speed processing, because the value of the 1 frame delay circuit 122+123 changes by a very small adjustment value, and hence no abrupt change is made.

Figure 18:
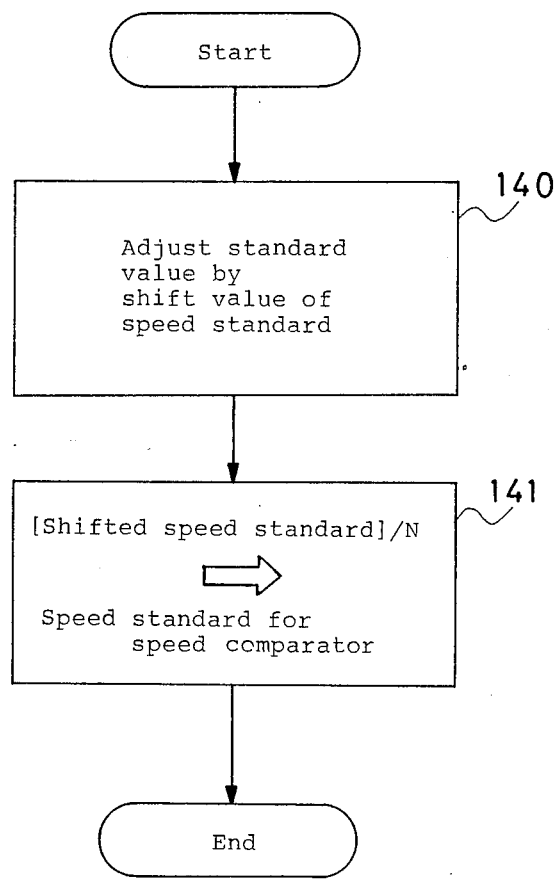
FIG. 18 is a flow chart showing a processing of the collection of the speed standard of the same speed.

FIG. 18 is a flow chart showing a computation sequence of the actual speed standard based on the speed command by the shift amount of the speed standard obtained by the flow chart of FIG. 17. This process is represented in FIG. 4 by the summing point 20 and the speed setting circuit 21. In the first step 140, by using a shift value of the speed standard obtained by FIG. 17, the speed standard corresponding to the speed of recording is changed. In the next step 141, by using the speed command (speed multiply ratio N), the speed standard value for actual reproduction speed is computed and the computed value is issued to the speed comparator 22. In the speed comparator 22, the output signal of the frequency generator 17 is compared with the computed speed standard value; and the speed standard corresponding to the adjusted speed of recording is divided by the speed multiplying factor N to yield the speed instruction. Accordingly, it is apparent that even if the speed command is changed, as long as tape speed at the recording time is found once there is no problem at all.

The above-mentioned case where the tape speed at recording time and speed standard at reproducing time does not agree causes the tracking error signal to have a certain DC component. The above process is also effective even for such a case where a difference between tape speed at recording time, and the speed standard at reproducing time is large, and hence pull-in of capstan phase by the tracking error signal is not possible. Such case is described in the following.

When a difference between the tape speed of recording and a speed standard of the reproduction becomes large, hence disabling the pull-in of phase, a so called phase-unlocked state is produced, and the tracking error signal either has a leading phase or a lagging phase at this time with respect to the tape transport. In such a state, since the tape transport speed is controlled by such phase information, there are two speeds of variations of the tracking error signal levels. The difference depends on whether the "speed difference polarity", which is a polarity of a difference between the speed standard, and the "speed variation polarity", which is a polarity of variation of speed by the presently obtained tracking error signal, are of the same polarity as each other. Accordingly, in the phase unlocked state, when fine-adjustments are repeated, the value inside 1 frame delay circuit 222+223 show the correct direction of the speed standard. That is, which of phase led or phase lag will appear in a given case can be known with certainty. In accordance with this principle, the problem of shift of the standard is obviated because the speed standard is continuously adjusted. In this method, since the value of the 1 frame delay circuit 222+223 can be a shift of the standard, and since the internal state of the 1 frame delay circuit 222+223 is fine-adjusted, and hence does not make a rapid change, it can be easily executed as a part of an other process in the flow chart of FIG. 15.

By employing the above-mentioned configuration and operation in accordance with that shown in the flow charts, using one microprocessor 1, all three controlling functions of controlling of rotation of the rotary head drum 9, controlling the phase of the tape transport, and control of the tracing of curved tracks, can be made using a time sharing scheme.

Apart from the above-mentioned embodiment where the counter timer-a 7 and the counter timer-b 8 are shown separately from the microprocessor 1, a recent 1chip microcomputer which is widely used in controlling has counter timers which are normally constituted on the same chip together with other functional parts, such as A/D converter, and the constitution of the apparatus becomes more simple and easy to configure.

In the above-mentioned embodiment, the processing of the microprocessor is described as being an interrupt process, whereas in the period where no interrupt takes place, certain sequence processing such as, accessing the operation switch and deciding what is to be done next, can be made at the same time. From this point of view, the present invention has a great actual advantage.

Though the above-mentioned embodiment comprises a head actuator controlling system for tracing curved tracks and for attaining noiseless special effects reproduction, the embodiment of the present invention is not necessarily limited to those comprising such functions, but is also effective for a more simple VTR wherein track curve is small or there is no use of noiseless special effects reproduction.

Although the invention has been described in its preferred form with a certain degree of particularity, it is understood that the present disclosure of the preferred from has been changed in the details of construction and the combination and arrangement of parts may be resorted to without departing from the spirit and the scope of the invention as hereinafter claimed.

What is claimed is:

1. A tape reproducing apparatus of a type which reproduces information signals off a tape having them recorded as a group of discontinuous recording tracks, which tape is wound helically around a cylinder provided with a rotary head, which produces a reproducing signal, and which is mounted on a position adjusting electromechanical transducer which can adjust in a direction of the head vertical to said recording tracks, said tape also contacting a tape transporting capstan, the apparatus comprising:
   tracking error signal circuit means for producing a tracking error signal for tracking control based on said reproducing signal produced from said rotary head;
   first means for generating a first pulse signal at every 360°/n of rotation, where n is a positive integer, of said rotary head;
   second means for generating a second pulse signal at intervals of rotation of said tape transporting capstan;
   third means for controlling a head rotation speed based on said first pulse signal;
   fourth means for controlling a capstan rotation speed based on said second pulse signal;
   fifth means for producing a first speed error signal by comparing said head rotation speed and a signal indicative of a standard speed of head rotation;
   sixth means for producing a second speed error signal by comparing said capstan rotation speed and a capstan speed standard signal, indicative of a standard speed of capstan rotation; and
   processing means for time sharing processing between one of a plurality of operations, said operations including a first operation for generating and issuing a head rotation speed control signal based on said first speed error signal, a second operation for generating and issuing a capstan rotation speed control signal based on said second speed error signal and a third operation for generating and issuing a tracking control signal for controlling said electromechanical transducer for tracking based on said tracking error signal, the one of said selective operations, which is currently being carried out, being controlled by said first pulse signal.

2. A tape recording-playback apparatus in accordance with claim 1, which further comprises
   means for detecting a DC component of said tracking control signal to said electromechanical transducer, to issue said DC component, and
   means for varying said capstan rotation speed standard signal based on said DC component.

3. A tape recording-playback apparatus in accordance with claim 2, wherein
   said capstan rotation speed standard signal for a non-standard speed is produced by adjusting said capstan rotation speed standard for a normal recording speed based on said DC component and then dividing said capstan rotation speed standard for said normal speed by a selected speed multiplying ratio at playback.

4. A tape recording-playback apparatus in accordance with claim 1, wherein said first means comprises
   seventh means for issuing a third pulse signal at intervals of rotation of said write/read head of a predetermined phase, and
   eighth means for issuing a signal having a period of rotation of said write/read head divided by a positive integer.

5. An apparatus as in claim 1 wherein said processing means comprises:
   interrupt receiving means for recognizing an interrupt based on said first pulse signal applied thereto;
   routine determining means, coupled to said interrupt receiving means, for determining a type of said interrupt; and
   routine executing means, coupled to said routine determining means, for executing a routine comprising one of said selective operations based on said type of interrupt.

6. An apparatus as in claim 5 wherein said routine determining means includes a counter, a value of which indicates said type of said interrupt.

7. A tape reproducing apparatus of a type which reproduces information signals recorded as a group of discontinuous recording tracks on a recording tape which is wound helically around a cylinder provided with a rotary head which produces a reproducing signal and which is mounted on a position adjusting electromechanical transducer, said tape also guided by a tape transporting capstan,
   the apparatus comprising:
   first means for generating a first pulse signal at every 360°/n rotation, where n is a positive integer, of said rotary head;

second means for generating a second pulse signal at intervals of rotation of said tape transporting capstan;

third means for controlling a head rotation speed based on said first pulse signal;

fourth means for controlling a capstan rotation speed based on said second pulse signal;

fifth means for producing a first speed error signal by comparing said head rotation speed and a signal indicative of a standard speed of rotary head rotation;

sixth means for producing a second speed error signal by comparing said capstan rotation speed and a capstan rotation speed standard signal indicative of a standard speed of capstan rotation; and processing means for carrying out selective operations on a time sharing basis, said selective operations including a first operation for operating and issuing a head rotation speed control signal based on said first speed error signal, and a second operation for operating and issuing a capstan rotation speed control signal based on said second speed error signal, which among said selective operation being carried out being controlled by said first pulse signal.

8. An apparatus as in claim 7 further comprising tracking error signal circuit means for producing a tracking error signal for tracking control based on said reproducing signal obtained from said rotary head.

9. An apparatus as in claim 7 wherein said processing means comprises:

interrupt receiving means for recognizing an interrupt based on a said first pulse signal applied thereto;

routine determining means, coupled to said interrupt receiving means, for determining a type of said interrupt; and routine executing means, coupled to said routine determining means, for executing a routine comprising one of said selective operations based on said type of interrupt.

10. An apparatus as in claim 9 wherein said routine determining means includes a counter, a value of which indicates said type of said interrupt.

11. An apparatus as in claim 10 wherein one type of interrupt is indicated by an even value of said counter and another type of interrupt is indicated by an odd value of said counter.

12. A method for operating a tape reproducing apparatus of a type which reproduces information signals recorded as a group of discontinuous recording tracks on a recording tape which is wound helically around a cylinder provided with a rotary head which produces a reproducing signal, said rotary head mounted on a position adjusting electromechanical transducer, the tape also being guided by a tape transporting capstan, comprising the steps of:

producing a tracking error signal for tracking control based on said reproducing signal;

detecting a rotation of said rotary head;

generating a first pulse signal at every 360°/n rotation of said rotary head, where n is a positive integer;

generating a second pulse signal at intervals of rotation of the tape transporting capstan;

controlling a head rotation speed based on said first pulse signal;

controlling a capstan rotation speed based on said second pulse signal;

producing a first speed error signal by comparing said head rotation speed and a signal indicative of a standard speed of head rotation;

producing a second speed error signal by comparing said capstan rotation speed and a capstan rotation speed standard signal indicative of a standard speed of capstan rotation; and time-sharing operating a processing means to carry out selective operations on a time sharing basis, which of said selective operations being carried out being based on said first pulse signal, said selective operations including a first operation for operating and issuing a head rotation speed control signal based on said first speed error signal, and a second operation for operating and issuing a capstan rotation speed control signal based on said second speed error signal.

13. A method as in claim 12 wherein said selective operations further include a third operation for operating and issuing a tracking control signal to control said electromechanical transducer for tracking, based on said tracking error signal.

14. A method as in claim 12 wherein said time share operating a processor step comprises the steps of:

recognizing an interrupt based on said first pulse signal;

determining a type of said interrupt; and executing a routine comprising one of said selective operations based on said type of interrupt.

15. A method as in claim 14 wherein said determining a type of said interrupt step includes the steps of counting interrupts and using a value of such count to determine a type of interrupt.

16. A method as in claim 15 wherein one type of interrupt is indicated by an even count and another type of interrupt is indicated by an odd count.

17. A tape reproducing apparatus of a type which reproduces information signals recorded as a group of discontinuous recording tracks on a recording tape which is wound helically around a cylinder provided with a rotary head which produces a reproducing signal and which is mounted on a position adjusting electromechanical transducer, the tape also being guided by a tape transporting capstan, the apparatus comprising:

first means for generating a first pulse signal at predetermined intervals of rotation of said rotary head;

second means for generating a second pulse signal at every interval of rotation of a tape transporting capstan;

third means for controlling a head rotation speed based on said first pulse signal;

fourth means for controlling a capstan rotation speed based on said second pulse signal;

fifth means for producing a first speed error signal by comparing said head rotation speed and a signal indicative of standard speed of head rotation;

sixth means for producing a second speed error signal by comparing said capstan rotation speed and a capstan rotation speed standard signal indicative of a standard speed of capstan rotation; and a single processor including means for time sharing between processing one of a plurality of operations based on said first pulse signal, said operations including a first operation for operating and issuing a head rotation speed control signal based on said first speed error signal, and a second operation for operating and issuing a capstan rotation speed control signal based on said second speed error signal.

18. An apparatus as in claim 17 further comprising tracking error signal circuit means for producing a tracking error signal for tracking control based on said reproducing signal from said rotary head; and wherein said operations which are time shared between by said single processing means includes a third operation for operating and issuing said tracking control signal to control said electromechanical transducer for tracking based on said tracking error signal.

19. An apparatus as in claim 17 wherein said processing means comprises:

interrupt receiving means for recognizing an interrupt based on said first pulse signal applied thereto;

routine determining means, coupled to said interrupt receiving means, for determining a type of said interrupt; and routine executing means, coupled to said routine determining means, for executing a routine comprising one of said selective operations based on said type of interrupt.

20. An apparatus as in claim 19 wherein said routine determining means includes a counter, a value of which indicates said type of said interrupt.

21. An apparatus as in claim 20 wherein one type of interrupt is indicated by an even value of said counter and another type of interrupt is indicated by an odd value of said counter.

* * * * *